United States Patent
Tan et al.

(10) Patent No.: US 10,185,297 B2
(45) Date of Patent: Jan. 22, 2019

(54) ENHANCED WAKE ACTIVATION RESPONSE SPEEDS FOR INDUSTRIAL CONTROL SYSTEMS

(71) Applicant: ROCKWELL AUTOMATION TECHNOLOGIES, INC., Mayfield Heights, OH (US)

(72) Inventors: Teck Siang Tan, Singapore (SG); Pei Fang Julie Yeoh, Singapore (SG); ZhiGang Yu, ShangHai (CN)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 288 days.

(21) Appl. No.: 14/741,024

(22) Filed: Jun. 16, 2015

(65) Prior Publication Data
US 2016/0370777 A1    Dec. 22, 2016

(51) Int. Cl.
*G05B 19/048*    (2006.01)
*G05B 19/10*    (2006.01)

(52) U.S. Cl.
CPC ......... *G05B 19/048* (2013.01); *G05B 19/102* (2013.01); *G05B 2219/25286* (2013.01)

(58) Field of Classification Search
CPC ................ G05B 19/048; G05B 19/102; G05B 2219/25286
See application file for complete search history.

(56) References Cited

U.S. PATENT DOCUMENTS

| | | | | |
|---|---|---|---|---|
| 4,634,946 A | * | 1/1987 | Moulds, III | G05B 13/04 318/561 |
| 7,513,952 B2 | * | 4/2009 | Mestha | G01J 3/46 118/712 |
| 9,106,172 B2 | * | 8/2015 | Frankstein | H02P 29/0061 |
| 9,436,201 B1 | * | 9/2016 | Teirelbar | G05F 1/67 |
| 2012/0169490 A1 | * | 7/2012 | Yu | G08B 21/182 340/522 |
| 2012/0221155 A1 | | 8/2012 | Miles et al. | |
| 2013/0067941 A1 | * | 3/2013 | Lee | F24F 11/006 62/126 |
| 2013/0261814 A1 | * | 10/2013 | Shrall | G06F 1/206 700/286 |
| 2014/0195066 A1 | * | 7/2014 | Nanda | G06F 1/206 700/300 |

* cited by examiner

*Primary Examiner* — Robert A Cassity
(74) *Attorney, Agent, or Firm* — Fletcher Yoder, P.C.

(57) ABSTRACT

One embodiment of the present disclosure describes a method executed by a processor. The method includes receiving a signal associated with a process system transitioning from a reduced energy mode to an active mode. The process system includes devices configured to operate based on data acquired by sensors. The method includes determining a difference between a set of actual data acquired by the sensors and a desired operating parameter of the process system. The method includes reducing the difference using a control algorithm based at least in part on a preload value (e.g., a predetermined value representative of data acquired by the sensors) retrieved from a memory device. The method includes determining a set of control signals based in part on the reduced difference and transmitting the set of control signals to the devices, thereby driving a current operating parameter of the process system toward the desired operating parameter.

20 Claims, 3 Drawing Sheets

ENHANCED WAKE ACTIVATION RESPONSE SPEEDS FOR INDUSTRIAL CONTROL SYSTEMS

BACKGROUND

The present disclosure generally relates to controls systems, and more particularly to an industrial control system having enhanced response speeds during a sleep-wake transition period and techniques used to enhance response speeds of the industrial control system.

Many industrial applications utilize industrial control systems, and a wide variety of control system designs are implemented within the industrial control systems. In general, a feedback loop control system is a type of control system design that is widely used in industrial control systems to control a process (e.g., industrial or manufacturing process). A particular problem with existing control systems, and particularly with feedback loop control systems, is the response speed of the industrial control system during a sleep-wake transition period. For example, certain process systems transition between a "sleep" or energy saving mode and a "wake" or active mode based on the demand of the process system output. In certain situations, the response speed of the control system may be slow, as the process system transitions from the sleep mode to the wake mode. Accordingly, it may be beneficial to improve the response speed of the control system during the sleep-wake transition period to improve the efficiency and output of the process system as it transitions to a wake or active mode.

BRIEF DESCRIPTION

In an embodiment, a method is provided. The method includes receiving, via a processor, a signal associated with a process system transitioning from a reduced energy mode to an active mode. The process system includes one or more devices configured to operate based on data acquired by one or more sensors of the process system. The method also includes determining, via the processor, a first difference between a first set of actual data acquired by the sensors and a desired operating parameter of the process system. The method also includes reducing, via the processor, the first difference using a control algorithm based at least in part on a preload value retrieved from a memory device. The preload value is a predetermined value representing data acquired by the sensors, and the predetermined value is different from the first set of actual data. The method also includes determining, via the processor, a first set of control signals based at least in part on the first reduced difference. The first set of control signals are associated with one or more output parameters for the one or more devices. The method also includes transmitting, via the processor, the first set of control signals to the one or more devices, thereby driving a current operating parameter of the process system toward the desired operating parameter.

In another embodiment, a system is provided. The system includes a process system and a controller coupled to the process system. The process system is configured to transmit a signal associated with the process system transitioning from a reduced energy mode to an active mode. The process system comprises one or more devices configured to operate based on data acquired by one or more sensors of the process system. The controller is configured to provide one or more output parameters for the one or more devices. The controller is also configured to receive the signal from the process system, determine a difference between a set of actual data acquired by the sensors and a desired operating parameter of the process system, and minimize the difference with the control algorithm based at least in part on a preload value retrieved from a memory device. The preload value is a predetermined value representing historical data that may be acquired by the sensors. The controller is also configured to determine one or more control signals associated with the output parameters based at least in part on the reduced difference and transmit the one or more control signals to the process system. The one or more control signals are configured to adjust the one or more output parameters for the one or more devices closer to the desired operating parameter of the process system.

In another embodiment, a tangible, non-transitory, computer readable medium is provided. The tangible, non-transitory, computer readable medium includes machine-readable instructions to receive a signal from a process system associated with the process system transitioning from a reduced energy mode to an active mode. The process system includes one or more devices configured to operate based on data acquired by one or more sensors of the process system. The machine-readable instructions further determine a difference based on a set of actual data acquired by the sensors and a desired operating parameter of the process system and determine a reduced difference based at least in part on a preload value retrieved from a memory device. The preload value is a predetermined value representing historical data that may be acquired by the sensors. The machine-readable instructions further determine one or more control signals associated with output parameters for the one or more devices based at least in part on the reduced difference and transmit the one or more control signals to the process system. The one or more control signals are configured to adjust the one or more output parameters for the one or more devices closer to the desired operating parameter of the process system.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

While the present disclosure may be susceptible to various modifications and alternative forms, specific embodiments have been shown by way of example in the drawings and tables and have been described in detail herein. However, it should be understood that the embodiments are not intended to be limited to the particular forms disclosed. Rather, the disclosure is to cover all modifications, equivalents, and alternatives falling within the spirit and scope of the disclosure as defined by the following appended claims. Further, although individual embodiments are discussed herein to simplify explanation, the disclosure is intended to cover all combinations of these embodiments.

Embodiments of the present disclosure generally relate to industrial control systems that may monitor and/or control a process system. The process system may be any type of industrial process system and/or any type of industrial process plant (e.g., oil and gas, refining, chemical, pharmaceutical, food and beverage, water and/or wastewater, paper, utility power or water, mining, metals, etc.) having one or more sensing devices and one or more control devices. Specifically, systems and methods of the present disclosure generally relate to improving the performance of an industrial control system by enhancing the response speed of the process system when transitioning the process system from a sleep mode to a wake mode. As noted above, a process system may often transition between a sleep mode and an active mode depending on the demand for the output provided by the process system. For example, the process system may enter a sleep mode (e.g., reduced activity mode, energy saving mode) when demand for the process output is below a sleep threshold, and the process system may transition to a wake mode (e.g., an active mode) when demand for the process output is above a wake threshold. In certain situations, the industrial control system, which may be used to control the process system based on sensed feedback from the process system, may also enter a sleep mode when the process system enters the sleep mode and a wake mode when the process system enters the wake mode. As further described in detail below, it may be beneficial to improve the response speed of the process system when the process system transitions from the sleep to the wake mode to improve the efficiency and output of the process system. Specifically, it may be beneficial to manipulate the inputs of the industrial control system to improve the response time of the process system (and/or the industrial control system) when transitioning from a sleep mode to a wake mode.

In certain embodiments, the industrial control system may monitor and/or control the process system via a feedback loop. For example, in certain situations, a feedback loop may provide data from the process system that may be used by the industrial control system to manipulate one or more controlled variables of the process system to achieve desired levels or outputs (e.g., desired target values or ranges, desired setpoint value, etc.) of the process system. In certain embodiments, the industrial control system may employ a controller to determine adjustments to controlled variables of the process system based on the feedback data from the process system. For example, the controller may be a proportional-integral-derivative controller (e.g., PID controller), a proportional-integral controller, a proportional-derivative controller, a integral controller, a proportional controller, or so forth. With this in mind, the PID controller may calculate and minimize a difference (e.g., error) between a measured process variable of the process system (e.g., feedback) and the desired process system levels (e.g., desired target values or ranges, the desired setpoint value, etc.), such as the desired process system output levels. For example, the PID controller may minimize this difference by adjusting or manipulating a controlled variable of the process system. That is, the PID controller may determine anticipated trajectories or future values for measured and controlled variables of the process system based upon feedback data from the process system. The PID controller may then adjust the controlled variables of process system to obtain desired levels of these predicted variable trajectories. It should be noted, however, that any type of controller or combination of controllers suitable for controlling and/or regulating a feedback loop may be implemented with the industrial control system.

When transitioning from a sleep mode to an active mode, the industrial control system may receive a command to activate the process system to achieve a desired output. As such, in one embodiment, the PID controller may increase the output of the process system, receive feedback regarding the output of the process system, and adjust the controlled variables of the process system based on a difference between the feedback value and the desired output value. In this manner, the PID controller may incrementally increase the output of the process system until the feedback data from the process system indicates that the desired output is achieved. In certain embodiments, enhancing the speed at which the process system achieves the desired output during the sleep-wake transition period may involve preloading feedback data that the PID controller may use to adjust the controlled variables of the process system. For example, in certain embodiments, the PID controller may use one or more preload values to manipulate sensed feedback and thus adjust one or more controlled variables of the process system to cause the process system to provide an output that may be closer to the desired output. After the process system adjusts its controlled variables based on the commands from the PID controller, the PID controller may then receive real feedback data from the process system and further adjust the controlled variables of the process system to achieve the desired output. Since the controlled variables currently being used by the process system do not correspond to initial control variables commonly present when initially exiting the sleep mode, the feedback data provided to the PID controller may be closer to the desired output as compared to initializing the process system from its sleep mode. As a result, the process system may exit its sleep mode and achieve the desired setpoint more quickly.

Figure 1:
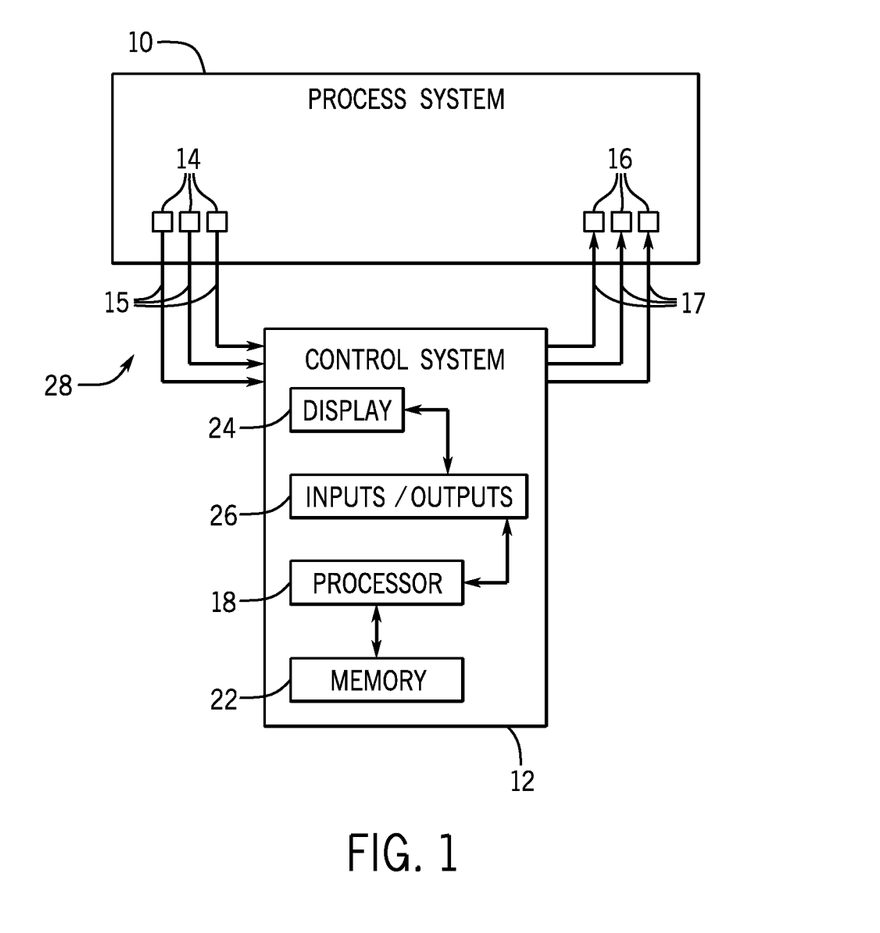
FIG. 1 is a schematic block diagram of a process system equipped with a control system, in accordance with embodiments of the present disclosure.

With the forgoing in mind, FIG. 1 is a schematic block diagram of a process system 10 that is at least partially monitored and/or regulated by a control system 12. The process system 10 may be any type of industrial process system and/or any type of industrial process plant (e.g., oil and gas, refining, chemical, pharmaceutical, food and beverage, water and/or wastewater, paper, utility power or water, mining, metals, etc.). For example, in certain embodiments, the process system 10 may be a manufacturing process, a steady state or batch process, a chemical process, a material handling process, an engine or other energy utilizing process, an energy production process, a utility distribution process, and so forth. Indeed, in complex processes found throughout various industries, the process system 10 may receive various types of feed stocks, electrical energy, fuels, utilities, parts, assemblies and sub-assemblies, and the like, to generate products, semi-finished products, assemblies, manufacturing products, by products, and the like. The control system 12 may dynamically monitor and/or control various operations of the process system 10, including control of the supply, the production, and the output of the process system 10. For the purposes of the disclosure, a water distribution process system may be utilized as an exemplary embodiment of the process system 10 to describe one or more embodiments of the present disclosure disclosed in FIGS. 1-4. However, it should be noted the embodiments described herein are not limited to this exemplary embodiment, and may be utilized in a wide variety of processes and industries, as noted above.

In the illustrated embodiment, the process system 10 includes a number of input devices 14 that may detect various operational parameters of the process system 10. For example, the input devices 14 may be sensors that detect (e.g., measure, sense) current operational parameters of a process variable of the process system 10. A process variable of the process system 10 may be a dynamic feature of the process system 10 that varies during the operation of the process system 10. In general, the input devices 14 may include various types of sensors, such as measurement devices, motion sensors, transducers, a pressure sensor, a temperature sensor, a level sensor, a flow sensor, and the like, that may produce discrete or analog signals and values representative of the current operating parameters of the process variables. The current operating parameters may include, for example, sensed or measured information related to temperatures, pressures, levels, flows, quantity of inputs or outputs, speeds of production or manufacturing operations, or any other operating parameter that dynamically varies during operation of the process system 10. The input devices 14 commonly produce voltage or current outputs that are representative of sensed feedback and/or the measured data generated by the process variables. The input devices 14 may communicatively coupled to the control system 12, and may provide the sensed feedback and/or the measured data as feedback signals 15 to the control system 12, where the feedback signals are related to the detected conditions of the process system 10.

In certain embodiments, based on the sensed feedback and/or the measured data received from the input devices 14, the control system 12 may output one or more control signals 17 to output devices 16. The output devices 16 may include a variety of control or operational equipment that may control a controlled variable of the process system 10. A controlled variable of the process system 10 may be a dynamic feature of the process system 10 that regulates the output of the process system 10. For example, the controlled variable may be controlled by adjusting an operational parameter of the output devices 16, which include various types of electric motors, valves, actuators, pumps, and/or flow control devices that may perform a mechanical action in response to the control signals from the controls system 12. Indeed, the control of the controlled variable may be implemented by adjustments to the output devices 16, which in turn control the output of the process system 10.

In certain embodiments, the process system 10 may transition between a sleep mode and an active mode depending on the demand for the output produced by the process system 10. It should be noted that in some situations, the control system 12 may regulate when the process system 10 transitions between the sleep mode and the active mode, or various other operational modes or statuses. Further, in certain situations, the control system 12 may enter a similar mode as the process system 10. For example, based on the sensed feedback provided by the process system 10 and/or the lack of sensed feedback provided by the process system 10, the control system 12 may enter the sleep or active mode. In certain embodiments, the control system 12 may transition to a wake mode when a wake activation signal or an initial feedback signal is received.

For example, within a utility distribution system, such as a water distribution system, the water distribution system may transition between a sleep mode or a wake mode depending on the demand for the output of the water distribution system (e.g., water). The water distribution system may include one or more input devices 14, such as pressure sensors, flow sensors, temperature sensors, and so forth. Further, the water distribution system may include one or more output devices 16, such as water pumps, actuators, flow control devices (e.g., valves, orifice plates, etc.). The input devices 14 may provide a feedback signal 15 (or a wake activation signal) to the control system 12, where the feedback signals are related to the detected conditions of the water distribution system (e.g., pressure of the water output, flow of the water output, quantity of the water available, etc.). Further, based on the feedback signal and/or a demand for the water output, the control system 12 may control a water pump to increase/decrease supply to meet the demands. In certain situations, based on the feedback signals, the control system 12 may determine the status of the process system 10 (e.g., active mode, sleep mode, etc.).

The control system 12 may utilize the input devices 14 and the output devices 16 to monitor and/or control the process system 10. In certain embodiments, the control system 12 may include an application-specific or general purpose computer, processor, or other programmable device programmed to carryout the functions described herein. In the illustrated embodiment, the control system 12 includes a processor 18. As depicted, the processor 18 (e.g., processing circuitry) and/or other data processing circuitry may be operably coupled to the memory 22 to retrieve and execute instructions for monitoring and controlling the process system 10. For example, these instructions may be encoded in programs or software that are stored in memory 22, which may be an example of a tangible, non-transitory computer-readable medium, and may be accessed and executed by the processor 18 to allow for the presently disclosed techniques to be performed. Specifically, carrying out the functions described herein via these instructions may help to improve the function of the control system 12 (e.g., application-specific or general purpose computer, processor, or other programmable device) by improving efficiency and reliability. The memory 22 may be a mass storage device, a FLASH memory device, removable memory, or any other non-transitory computer-readable medium. Additionally and/or alternatively, the instructions may be stored in an additional suitable article of manufacture that includes at least one tangible, non-transitory computer-readable medium that at least collectively stores these instructions or routines in a manner similar to the memory 22 as described above. In some situations, one or more processors 18 may be disposed within and/or operate with the control system 12, and each processor 18 may cooperatively function with each other to control the process system 10.

Further, in certain embodiments, the control system 12 may include a display 24 and/or various input/output features 26 (e.g., I/O features 26). The display 24 may be any interactive (e.g., touch screen) or other display, that displays information received from the input devices 14 (e.g., current operational parameters, sensed feedback and/or measured data, etc.), information related to the output devices 16 (e.g., positional information of the output devices 16, control signals provided to the output devices 16, etc.), information related to the control system 12 (e.g., inputs/outputs received from an operator), information related to the status of the control system 12 and/or the process system 10 (e.g., sleep mode, wake mode, etc.). In certain embodiments, the I/O features 26 may be integral with the control system 12, and may receive feedback signals from the input devices 14 and provide control signals to the output devices 16. Further, in certain embodiments, the I/O features 26 may receive user inputs from an operator for various operational aspects of the control system 12 and/or the process system 10. For example, as further described in detail with respect to FIGS. 2-4, in certain embodiments, the I/O features 26 may receive a preload value or a setpoint value from the operator, and the control system 12 may utilize the preload value to enhance the response speeds of the process system 10 during a sleep-wake transition period of the process system 10, as further described below.

In certain embodiments, the input devices 14 (e.g., sensors) and the output devices 16 (e.g., actuators, motors, valves, pumps, etc.) may be utilized with a feedback loop 28 that is monitored and controlled by the control system 12 to control one or more operational aspects of the process system 10. In certain embodiments, the feedback loop 28 may be used by the industrial control system 12 to manipulate one or more controlled variables of the process system 10 to achieve desired levels or outputs (e.g., desired target values or ranges, desired setpoint value, etc.) of the process system 10. For example, based on the feedback received from the input devices 14, the control system 12 may generate one or more controls signals to control the output devices 16, thereby manipulating the controlled variables of the process system 10 to achieve desired levels or outputs. Accordingly, the control system 12 may monitor and control the feedback loop 28 to dynamically and continuously control aspects and characteristics of the process system 10 based on sensor feedback and/or measured data obtained from the process system 10.

With the forgoing in mind, the disclosed embodiments relate to enhancing the response speeds of the process system 10 when the process system 10 transitions from the sleep mode to the wake mode to improve the efficiency and output of the process system 10. Specifically, the response speed of the process system 10 may be improved by utilizing one or more preload values within one or more components of the control system 12. The preload values may be utilized by the control system 12 to manipulate the sensed feedback of the control system 12 and cause the process system 10 to provide an output that may be closer to the desired output, as further described in detail below with respect to FIGS. 2-4. Accordingly, the control system 12 may utilize the preload values to improve the response speed of the process system 10 (and/or the control system 12) as the process system 10 receives a new demand and transitions from the sleep mode to wake mode to meet the new demand. Further, after manipulating the sensed feedback to improve the response speed of the process system 10, the control system 12 may resume receiving real feedback and further adjusting the controlled variables of the process system 10 to meet the desired output or demand.

Figure 2:
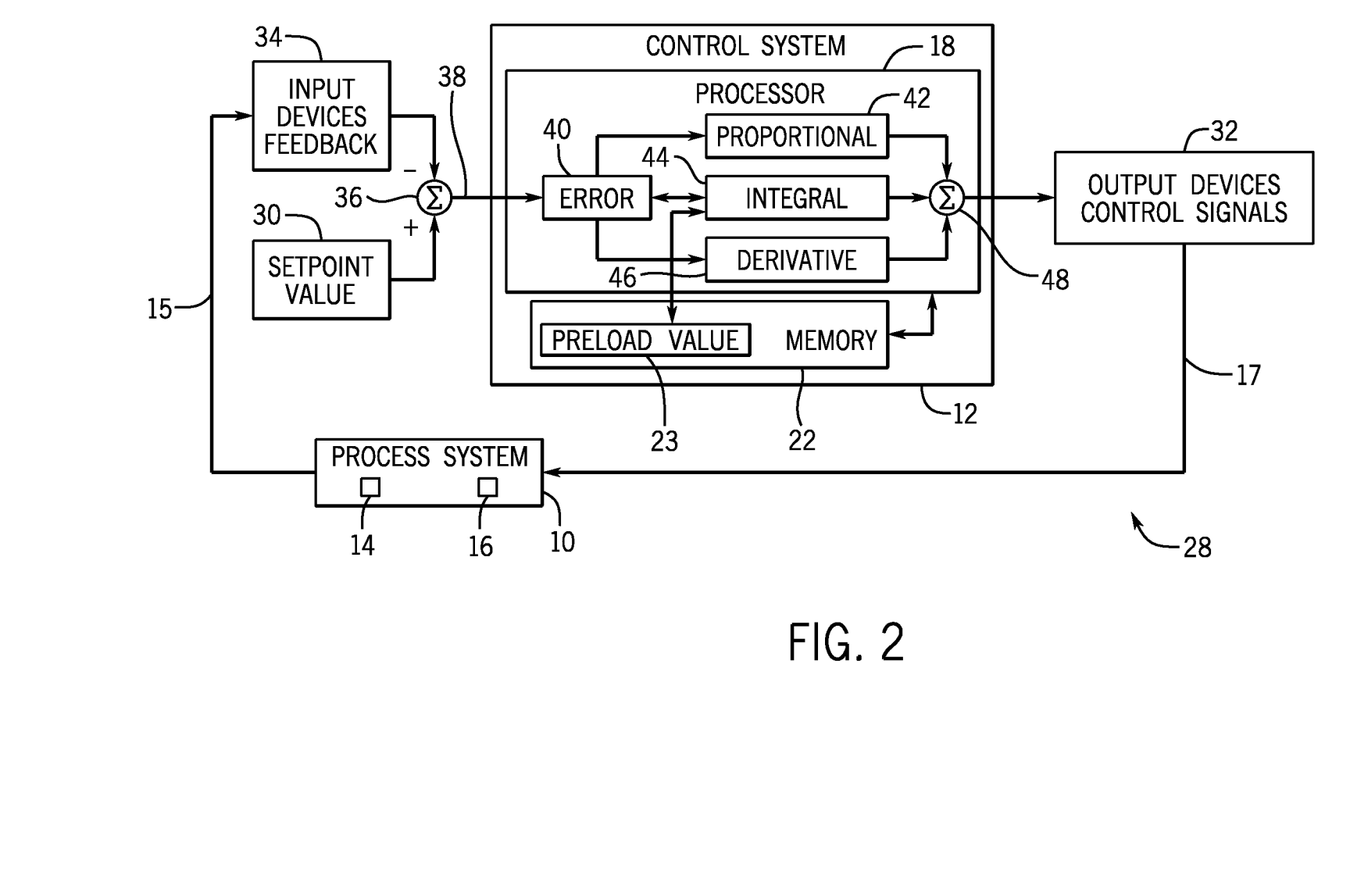
FIG. 2 is a schematic block diagram of a feedback control loop between the process system and the control system of FIG. 1, where the feedback control loop utilizes a preload value to enhance a wake activation response speed of the control system, in accordance with embodiments of the present disclosure.

FIG. 2 is a schematic block diagram of the feedback control loop 28 between the process system 10 and the control system 12 of FIG. 1. In particular, the control system 12 utilizes a preload value 23 and the feedback control loop 28 to enhance a response speed of the process system 10 when the process system 10 transitions between sleep and active modes, in accordance with embodiments of the present disclosure. As noted above, the process system 10 and/or the control system 12 may transition between a sleep mode and an active mode, based on the demand for the output provided by the process system 10. The preload value 23 may be a predetermined value loaded into one or more components of the processor 18 to initialize the control system 12 at an initial feedback value when the process system 10 transitions from a sleep mode to an active mode (and/or detects a new demand). Indeed, the control system 12 may manipulate the initial sensed feedback received from the process system 10 with the preload value 23, thereby causing the process system 10 to provide an output that is closer to the desired output. In this manner, the control system 12 may utilize the preload value 23 to initialize at a predetermined initial feedback value that is closer to the desired output, and the predetermined initial feedback value may be different than the actual initial feedback value received from the process system 10. In this manner, the control system 12 may increase the accuracy in controlling the output of the process system 10 when utilizing the preload value 23 and reduce the possibility of overshooting the desired output of the process system 10. Accordingly, the control system 12 may utilize the preload value 23 and the feedback control loop 28 to enhance the response speed (e.g., wake activation response speed) of the process system 10 during the transition period where the process system 10 (and/or the control system 12) resume active operations after detecting a new demand, as further described in detail below.

As noted above, the control system 12 may control and/or monitor the process system 10 with the feedback control loop 28. The control system 12 may include the processor 18 (e.g., processing circuitry) and/or the memory 22 (e.g., memory circuitry). In the illustrated embodiment, the control system 12 is described in the context of a proportional-integral-derivative controller (e.g., PID controller). However, it should be noted that in other embodiments, any type of controller may be utilized, such as any type of controller (e.g., proportional-integral controller, proportional-derivative controller, integral controller, proportional controller, etc.) that may anticipate trajectories or future values for measured and controlled variables based upon prior feedback knowledge. Indeed, any type of controller that may be implemented with the feedback control loop 28, the control system 12, and/or the process system 10 to bring the process system 10 to desired operating parameters or conditions may be utilized. Specifically, in the illustrated embodiment, the control system 12 may optimize control of the process system 12 with the feedback control loop 28.

In certain embodiments, the feedback control loop 28 may enable the control system 12 to iteratively tune the output device control signals 32 (provided as control signals 17) to achieve desired outputs from the process system 10 based on the input devices feedback 34 and a setpoint value 30. The input devices feedback 34 may be the sensed feedback and/or measured data detected and received from the process system 10 via the feedback signals 15. The setpoint value 30 may be the desired operating parameters, values, or outputs of the process system 10, which may be derived through operator input and/or from historical operating parameters. Accordingly, based on the input devices feedback 34 and the setpoint value 30, an adder 36 may calculate a difference 38 between the input devices feedback 34 and the setpoint value 30. Specifically, the difference 38 is represented as an error value 40 between the input devices feedback 34 and the setpoint value 30. The control system 12 may minimize the error value 40 by tuning the control signals 17 to adjust the operating parameters of the process system 10. Minimizing or reducing the error value 40 may result in the output of the process system 10 beginning to achieve the desired output or the desired setpoint value 30.

For example, in certain embodiments, the control system 12 may be configured with a proportional component 42, an integral component 44, and/or a derivative component 46. These components may in combination and/or independently be tuned by the control system 12 to minimize the error value 40. The proportional component 42 may be dependent on the present error value, and may calculate an output value that is proportional to the current error value. The integral component 44 may be dependent on the accumulation of past or historical errors, and may calculate an output value that is proportional to both the magnitude of the error and the duration of the error. The derivative component 46 may be a prediction of future error based on the current rate of change of the error over time. In certain embodiments, one or more of the output values calculated by the proportional, integral, and/or derivative components 42, 44, and/or 46 may be summed (e.g., weighed sum) with a second adder 48, and may be utilized to produce control signals 17 that adjust various operating parameters of the process system 10.

In particular, in certain embodiments, one or more of the components of the control system 12 (e.g., the proportional component 42, the integral component 44, and/or the derivative component 46) may utilize the preload value 23 to initialize the control system 12 at a predetermined level. For example, in the illustrated embodiment, when the control system 12 receives an initial feedback signal from the process system 10 (such as when the process system 10 transitions from the sleep mode to the wake mode), the integral component 44 may retrieve and load the preload value 23 from the memory 22 of the control system 12. Further, the integral component 44 may utilize the preload value 23 to start at a predetermined level. For example, the integral component 44 may initialize at a predetermined initial feedback value based on the preload value 23 and the input devices feedback 34, as opposed to initializing at an actual feedback value based only on the input devices feedback 34. The integral component 44 may calculate an output value that is proportional to both the magnitude of the error and the duration of the error based at least in part on the preload value 23 and the input devices feedback 34. In this manner, the control system 12 may utilize the preload value 23 to manipulate the input devices feedback 34 to cause the process system 10 to provide an output that is closer to the desired setpoint value 30. It should be noted that utilizing the preload value 23 in addition, or in some cases, as a substitute for the input devices feedback 34, may help increase the response speed of the process system 10 in achieving the desired setpoint more quickly, as further described below.

In certain embodiments, the preload value 23 is utilized within the control system 12 to enhance the response speed of the process system 10 as the process system 10 transitions from a sleep mode to a wake mode, such as when the process system 10 detects a demand request. Indeed, the response speed of the process system 10 may be described, for example, as the speed with which the process system 10 exits a sleep mode to meet a detected demand or a achieve a desired setpoint value 30 for an output of the process system 10. As noted above, utilizing the preload value 23 within the control system 12 may help to initialize the control system 12 at a predetermined feedback level or threshold, thereby helping the process system 10 achieve the desired setpoint value or meet the detected demand more quickly. It certain embodiments, initializing the control system 12 with the preload value 23 may help to reduce a number of iterations of the feedback loop 28, thereby tuning the control signals 17 more efficiently and effectively.

For example, when transitioning from a sleep mode to an active mode, the control system 12 may receive a command to activate the process system 10 to achieve a desired output. As such, in one embodiment, the control system 12 may increase the output of the process system 10, receive input device's feedback 34 regarding the output of the process system 10, and adjust the output devices 16 of the process system 10 based on a difference between the input devices feedback 34 and the desired setpoint value 30. In some situations, several iterations of the feedback loop 28 of receiving input devices feedback 34 and fine tuning the control signals 17 may be used to drive the process system 10 to the desired setpoint value 30. In certain embodiments, utilizing the preload value 23 within one or more components of the control system 12 (e.g., integral component 44) may start or initialize the control system 12 at a specific predetermined feedback level, such that the process system 10 achieves the desired setpoint value 30 more quickly, without overshooting the desired output values of the process system 10.

For example, when the water distribution system enters a sleep mode, the control system 12 communicatively coupled to the water distribution system may continue to operate, but may also enter a sleep or reduced activity mode. The water distribution system, upon detecting a demand for the water output via sensors (e.g., a pressure sensor) and/or operator input, may transition from the sleep mode to the active mode and provide an initial feedback signal or wake activation signal to the control system 12. Accordingly, the control system 12 may receive the initial feedback signal or wake activation signal and may also transition into the wake mode. In some of these situations, the error value 40 (e.g., the difference 38 between the setpoint value 30 and the input devices feedback 34) may be large as the process system 10 resumes operations to meet the demand. The control system 12 may also have a slow response speed in providing control signals that meet the sudden output demand of the process system 10, thereby resulting in a sluggish response and/or overshooting the desired output values of the process system 10.

Accordingly, as noted above, utilizing the preload value 23 within the control system 12 may enhance the response speed of the process system 10 as it transitions from the sleep mode to meet a demand or a desired output. Specifically, in certain embodiments, the control system 12 may manipulate the input devices feedback 34 (e.g. initial feedback signal) at least in part on the preload value 23, such that the control system 12 starts at a predetermined level immediately upon detecting the sleep-wake transition of the process system 10. In this manner, for example, the control system 12 may bypass one or more iterations of the feedback signals 15 and/or control signals 17 to enhance the response speed of process system 10 in meeting the detected demand. In certain embodiments, the preload value 23 may be preloaded into the control system 12 through operator input and/or may be accessed from the memory 22. In certain embodiments, after preloading the initial preload value 23 into the control system 12, the preload value 23 may be determined and/or tuned through one or more iterations of the feedback loop 28. For example, the preload value 23 may be determined via the one or more iterations of the feedback loop 28 after all gains in the control system 12 are determined.

The preload value 23 may be any value, percentage, range, or variable that is used by the process system 10 to describe a standard configuration or parameter of the process system 10. In certain embodiments, the preload value 23 may be any value that may be utilized by the control system 12 to represent or substitute for actual feedback sensed by the process system 10. Further, in certain embodiments, the preload value 23 may be a representation of an average of the amount of demand typically requested by the process system 10. It should be noted the preload value 23 may be customized for different types of process systems 10. For example, the preload value 23 may be different values depending on the type of process system 10 it is utilized within or depending on the type of feedback it is utilized to represent. For example, for a water distribution system, the preload value 23 may be a numerical value that translates to and/or is representative of the desired water output. In some situations, the preload value 23 may be a quantity of the water output, a flow rate of the water output, a temperature of the water output, a pressure of the water output, or any other operating parameter of the process system 10 that may be sensed and provided as a feedback signal 15 to the control system 12. As a further example, for the water distribution system, the preload value 23 may be a percentage that translates to and/or is representative of the desired water output relative to the maximum water output capacity of the process system 10. In some situations, the total capacity of the water distribution system may be any percentage between 0% to 100% or speed of motor (for water to flow) in unit Hertz or RPM. For example, the preload value 23 may be 70%, which is representative of a water output approximately equivalent to 70% of the total water output capacity. As a further example, for the water distribution system, the preload value 23 may be a numerical value that is representative of an average demand for the water output that is typically requested by the water distribution system.

Figure 3:
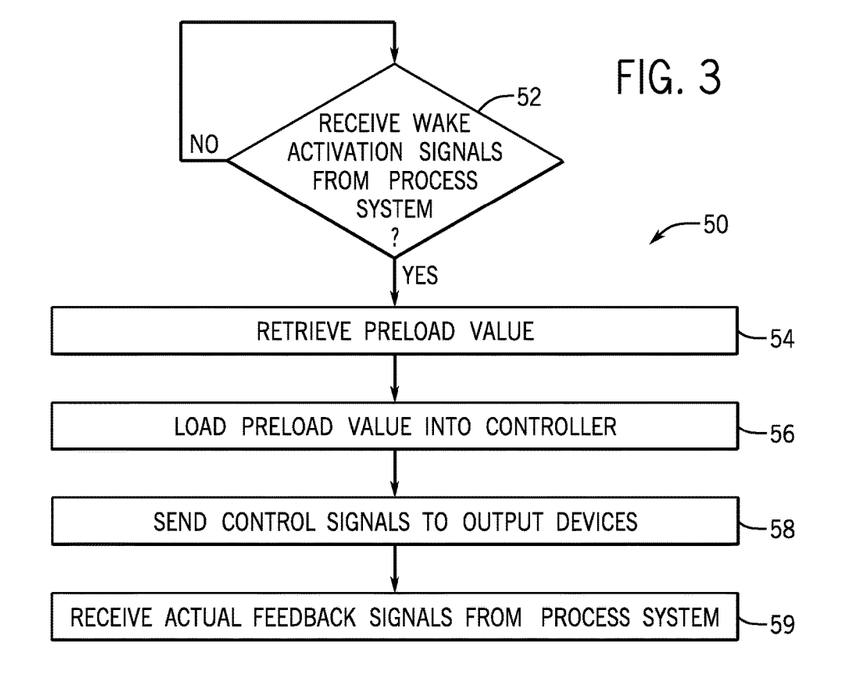
FIG. 3 illustrates exemplary logic for enhancing the wake activation response speed of the control system of FIG. 1, in accordance with embodiments of the present disclosure.

FIG. 3 illustrates exemplary logic for a method 52 for enhancing the wake activation response speed of the process system 10 of FIG. 1, in accordance with embodiments of the present disclosure. In particular, the method 50 may be implemented by the processor 18 of the control system 12, as discussed above with regard to FIGS. 1 and 2.

In certain embodiments, the method 50 includes the control system 12 receiving a wake activation signal from the process system 10, indicating a transition of the process system 10 from the sleep mode to a wake mode (block 52). In certain embodiments, the wake activation signal may be a feedback signal 15 that activates the feedback control loop 28 and provide an indication of the current operating parameters of the process system 10 (including a demand for the output of the process system 10). As noted above, the process system 10 may often transition between a sleep mode and an active mode, depending on the demand for the output provided by the process system 10. For example, in a water distribution system, the wake activation signal provided to the control system 12 may be indicative of a demand for the water. Indeed, the wake activation signal may be related to a current operating parameter of a pressure sensor, or any other type of input device 14 that detects the output demand that causes the process system 10 to transition to wake mode. If a wake activation signal is not detected from the process system 10, the control system 12 continues to monitor the process system 10 until a wake activation signal is received indicating a change in status for the process system 10.

In certain embodiments, if the wake activation signal (e.g., initial feedback signal) is received by the control system 12, the control system 12 may retrieve the preload value 23 (block 54) from the memory 22. In certain embodiments, the preload value 23 may be a predetermined value that is configured for enhancing the response speed of the process system 10 as the process system 10 transitions from the sleep mode to meet a detected demand or achieve the desired setpoint value 30. For example, for a water distribution system, the preload value 23 may be any value that may enhance the response speed of the process system 10 as it exits the sleep mode to meet a detected demand for the output of the water distribution system. For example, the preload value 23 may be a numerical value that translates and/or is representative of the desired water output of the water distribution system. In other embodiments, the preload value 23 may be any value that is a substitute for a sensed feedback of a parameter of the process system 10. Indeed, the preload value 23 may be any value that the control system 12 may utilize to enhance the response speed of the process system 10 in minimizing or reducing the error value 40 (e.g., difference between the input devices feedback 34 and the desired setpoint value 30). For example, the preload value 23 may be representative of a quantity, a flow rate, a pressure, a temperature, a percentage of the total water output, or any other value representative of the desired output of the water distribution system or representative of sensed feedback from the water distribution system. In certain embodiments, the preload value 23 may be received via user input and stored within the memory 22, and may be customized for different types of process systems 10. Further, in certain embodiments, one or more preload values 23 may be stored and accessed, and the control system 12 may select the preload value 23 based on the current operating conditions of the process system 10, based on the wake-up signal received, based on the component of the control system 12 utilizing the preload value 23, and/or based on characteristics of the demand of the output.

In certain embodiments, the retrieved preload value 23 is loaded into one or more components of the control system 12 (e.g., the integral component 44) and utilized within the feedback control loop 28 (block 56). For example, as noted above, the control system 12 may utilize the received input devices feedback 34 in combination with the setpoint value 30. Specifically, the setpoint value 30 may be combined with the received input devices feedback 34, and the resulting difference 38 is utilized by the control system 12 to represent the error value 40. The control system 12 may minimize the error value 40 to cause the process system 10 to provide an output that is closer to the desired setpoint value 30 or the detected demand. It should be noted that in certain embodiments, the preload value 23 may be a predetermined value that is utilized by the control system 12 to bypass one or more iterations of the feedback control loop 28. Accordingly, the control system 12 may be configured to minimize the error value 40 with enhanced efficiency and accuracy when utilizing the preload value 23. Based at least in part on the preload value 23, one or more components of the control system 12 (e.g., the proportional component 42, the integral component 44, and/or the derivative component 46) calculate one or more control signals 17 that are tuned to control the process system 10 closer to the desired setpoint value 30, such that the output demand of the process system 10 is met. Accordingly, the control signals 17 are sent to the output devices 16 of the process system 10 (block 58). In this manner, the control system 12 may utilize the preload value 30 to enhance a response speed of the process system 10 during the sleep-wake transition period of the process system 10. Further, it should be noted that after the control system 12 utilizes the preload value 30, the control system 12 may receive one or more actual feedback signals from the process system 10 (block 59). For example, the controls system 12 may receive real feedback from the input devices 14 and the input devices feedback 34 may be the actual current operating conditions of the process system 10. Further, the control system 12 may regulate and monitor the process system 10 based on the actual feedback signals from the process system 10.

It should be noted that in certain embodiments, it may be particularly beneficial for the control system 12 to utilize the preload value 23 within the feedback control loop 28 when it is desirable to reach the detected demand quickly or in the shortest time frame possible. In other words, the control system 12 may utilize the preload value 23 in order to quickly minimize the error value 40 to cause the process system 10 to quickly provide an output that is closer to the desired setpoint value 30. For example, in situations where the feedback 34 is lagging (e.g., between approximately 1 and 5 seconds, 5 and 10 seconds, or more than 10 seconds) and/or in situations where process system 12 needs to reach the setpoint value 30 within a certain amount of time (e.g., between approximately 0 and 5 seconds, 5 and 10 seconds, etc.), the control system 12 may utilize the preload value 23 to quickly bring the process system 12 to meet the detected demand. In situations or embodiments where the process system 12 is allowed a longer time to reach the desired setpoint value 30 (e.g., approximately 15 seconds or more) or does not need to reach the setpoint value 30 immediately, the control system 12 may or may not utilize the preload value 23. Indeed, in such situations, the process system 12 may have sufficient time to reach the desired setpoint value 30 or meet the desired demand without a great risk of overshooting the desired setpoint value 30, as further explained with respect to FIG. 4.

Figure 4:
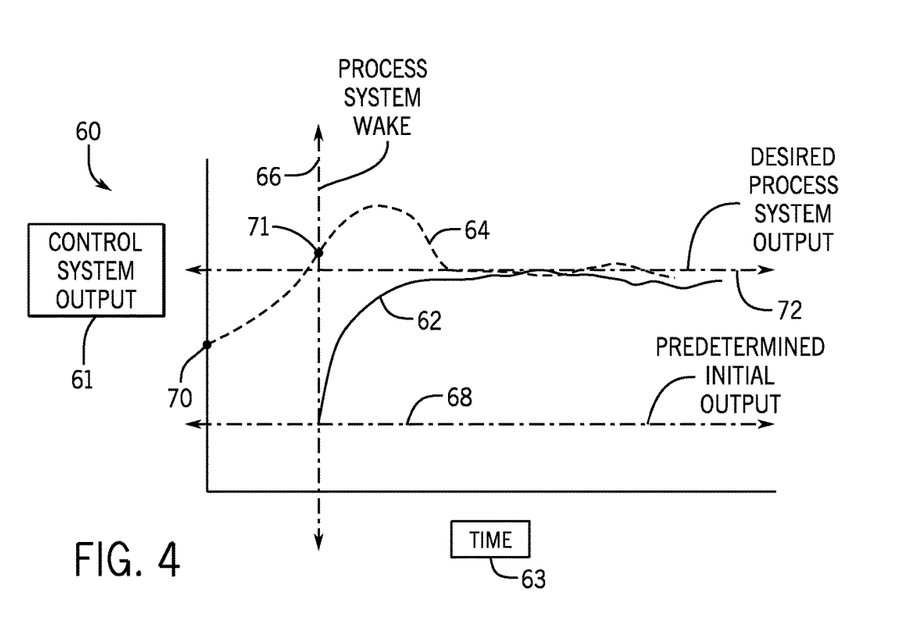
FIG. 4 is a graphical representation of an exemplary output of the control system of FIG. 1, illustrated in comparison to an exemplary output of another control system, in accordance with embodiments of the present disclosure.

FIG. 4 is a graphical representation 60 of an exemplary output 62 of the control system 12 of FIG. 1 utilizing the preload value 23, illustrated in comparison to an exemplary output 64 of a typical control system that does not utilize the preload value 23, in accordance with embodiments of the present disclosure. In the illustrated embodiment, the exemplary outputs 62, 64 are outputs 61 from a control system illustrated as a function of time 63. Specifically, the output 62 from the control system 12 utilizes the preload value 23 to illustrate that the process system 10 may have a quicker response speed after detecting a process system wake event 66. The process system wake event 66 may be a detected demand that causes the process system 10 to transition from a sleep mode to a wake mode. In response to the demand, the control system 12 may also transition to a wake mode to provide control signals 17 to the process system 10 to achieve the desired setpoint and/or to meet a demand of the process system 10, thereby minimizing or reducing the error value 40 of the control system 12.

With the forgoing in mind, the output 62 of the control system 12 that utilizes the preload value 23 may start at a predetermined initial output 68. Indeed, as noted above, the preload value 23 may be utilized by the control system 12 to initialize the control system 12 and the initialize the control signals 17 at the predetermined initial output 68. In certain embodiments, the preload value 23 may be utilized by the control system 12 to manipulate the initial feedback signals to cause the process system 10 to provide an output that may be closer to the desired output and/or meet the detected demand. In certain embodiments, such manipulation of the input devices feedback 34 may bypass one or more iterations of the feedback loop 28 to bring the output of the process system 10 closer to the desired output or demand. In certain embodiments, the control system 12 is pre-initialized at the predetermined initial output 68, such that an output of the process system 10 is closer to a desired process system output 72 even when the initial input devices feedback 34 is further away from the desired process system output 72. Further, after the pre-initialization, in certain embodiments, the control system 12 may receive real feedback from the process system 10 and further adjust the control signals 17 to tune the process system 10 such that it is closer to the demand and/or desired setpoint value 30.

In contrast, the output 64 of a typical control system that does not utilize the preload value 23 does not start at the predetermined level 68. For example, in the illustrated example, the control system 12 may be active while the process system 10 is inactive or asleep. Accordingly, the output 64 of the active control system 12 may be at the level 70 prior to the process system wake 66. Further, when the process system 10 transitions from the sleep mode to the wake mode at the process system wake 66, the output 64 of the typical control system may wake at a level 71 based on the initial feedback from the process system 10. Further, due to a difference between the desired process system output 72 and the level 71 (e.g., error value 40), the output of the typical control system may overshoot the desired process system output 72 as it attempts to adjust for the demand. Indeed, the typical control system may have to tune the control signals provided to the process system 10 in multiple iterations of the feedback control loop 28 in order to drive the output 64 toward the desired process system output 72. Accordingly, as noted above, utilizing the preload value 23 within the control system 12 may enhance the response speed (e.g., wake activation response speed) and the efficiency of the process system 10 as the process system transitions from the sleep mode to the wake mode to meet a detected demand.

While only certain features of present embodiments have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A method, comprising:
receiving, via a processor, a signal indicative of a desired operating parameter for a process system via an input configured to initiate an operation of the process system, wherein the input is provided by a user, wherein the signal is indicative of the process system transitioning from a reduced energy mode to an active mode, and wherein the process system comprises one or more devices configured to operate based on data acquired by one or more sensors of the process system;
initializing, via the processor, a control algorithm configured to reduce a first difference between a first set of actual data acquired by the sensors and the desired operating parameter in response to receiving the signal, wherein the control algorithm reduces the first difference based at least in part on a second difference between a preload value retrieved from a memory device and the desired operating parameter, wherein the preload value is a predetermined value representing a datatype associated with the first set of actual data and is determined based on a plurality of operating parameters received via the input prior to receiving the signal, wherein the preload value is different from the first set of actual data, and wherein the preload value is used as an initial feedback value for the control algorithm;
determining, via the processor, a first set of control signals based at least in part on the control algorithm and the second difference, wherein the first set of control signals is associated with one or more output parameters for the one or more devices; and
transmitting, via the processor, the first set of control signals to the one or more devices, thereby driving a current operating parameter of the process system toward the desired operating parameter.

2. The method of claim 1, wherein the preload value represents an average value of the plurality of operating parameters received prior to receiving the signal.

3. The method of claim 1, comprising:
determining, via the processor, a third difference between a second set of actual data acquired by the sensors and the desired operating parameter of the process system; and
determining, via the processor, a second set of control signals based at least in part on the control algorithm and the third difference, wherein the second set of control signals is associated with the one or more output parameters for the one or more devices.

4. The method of claim 3, comprising transmitting the second set of control signals to the one or more devices, thereby driving the current operating parameter toward the desired operating parameter.

5. The method of claim 1, wherein the signal comprises a feedback signal related to the current operating parameter of the process system.

6. The method of claim 1, wherein the control algorithm comprises a proportional-integral-derivative (PID) algorithm configured to calculate a current difference, a historical difference, or a predicted difference.

7. The method of claim 6, wherein determining the second difference comprises adding one or more of the current difference, the historical difference, or the predicted difference.

8. The method of claim 6, comprising calculating the historical difference based at least in part on the preload value.

9. The method of claim 1, wherein the control algorithm is configured to cause the current operating parameter to move closer to the desired operating parameter by reducing the first difference based at least in part on the preload value.

10. The method of claim 1, comprising iteratively implementing, via the processor, the control algorithm based on updated data acquired by the sensors after the control algorithm is initiated using the preload value.

11. A system, comprising:
a process system configured to transmit a signal associated with the process system transitioning from a reduced energy mode to an active mode in response to detecting an input associated with a request for water, wherein the input comprises an indication of a water temperature, wherein the process system comprises one or more devices configured to operate based on data acquired by one or more temperature sensors of the process system;
a controller coupled to the process system and configured to provide one or more output parameters for the one or more devices, and wherein the controller is configured to:
  receive the signal from the process system;
  reduce a difference between a set of actual data acquired by the temperature sensors and the indication of the water temperature of the process system in response to receiving the signal, wherein the difference is reduced using a control algorithm and a preload value retrieved from a memory device, wherein the preload value is a predetermined value representing historical data acquired by the temperature sensors, and wherein the preload value is used as an initial feedback value for the control algorithm;
  determine one or more control signals associated with the one or more output parameters based at least in part on the reduced difference; and
  transmit the one or more control signals to the process system, wherein the one or more control signals are configured to adjust the one or more output parameters for the one or more devices closer to the desired operating parameter of the process system.

12. The system of claim 11, wherein the signal comprises the indication of the water temperature, wherein the process system is configured to transition from the reduced energy mode to the active mode in response to the indication of the water temperature being above a certain threshold.

13. The system of claim 11, wherein the preload value is a predetermined value representing an average of the historical data.

14. The system of claim 11, wherein the one or more devices receive the one or more control signals from the controller and implement the one or more control signals in order to drive the one or more output parameters for the one or more devices closer to the indication of the water temperature.

15. The system of claim 14, wherein the one or more devices comprises a motor, a valve, an actuator, a pump, a flow control device, or a combination thereof.

16. The system of claim 11, wherein the controller is configured to minimize the difference by iteratively modifying the control algorithm.

17. The system of claim 11, wherein the signal comprises a feedback signal related to a current temperature associated with the process system.

18. The system of claim 17, wherein the control algorithm is configured to cause the current temperature to move closer to the indication of the water temperature by reducing the difference based at least in part on the preload value.

19. A tangible, non-transitory, computer readable medium comprising machine-readable instructions to:
receive a preload value from a user via an input device, wherein the preload value corresponds to a datatype related to an output of a process system, and wherein the preload value is used as an initial feedback value for a control algorithm;
receive a signal from the process system associated with the process system transitioning from a reduced energy mode to an active mode, wherein the process system comprises one or more devices configured to operate based on data acquired by one or more sensors of the process system, and wherein the signal comprises a desired operating parameter of the process system;
determine a difference based on a set of actual data acquired by the one or more sensors and the desired operating parameter of the process system in response to receiving the signal;
determine a reduced difference based at least in part on the preload value;
determine one or more control signals associated with one or more output parameters for the one or more devices based at least in part on the reduced difference; and
transmit the one or more control signals to the process system, wherein the one or more control signals are configured to adjust the one or more output parameters for the one or more devices closer to the desired operating parameter of the process system.

20. The computer readable medium of claim 19, wherein the instructions reduce the difference by iteratively modifying the control algorithm, and wherein the instructions reduce a number of times the control algorithm is iteratively modified by reducing the difference based at least in part on the preload value.

* * * * *